United States Patent
Wang et al.

(10) Patent No.: US 9,905,934 B2
(45) Date of Patent: Feb. 27, 2018

(54) ANTENNA SYSTEM AND TERMINAL

(71) Applicant: HUAWEI DEVICE (DONGGUAN) CO., LTD., Dongguan (CN)

(72) Inventors: Hongyu Wang, Shenzhen (CN); Shuwen Lv, Shanghai (CN); Huimin Zhang, Shenzhen (CN); Bin Wu, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 58 days.

(21) Appl. No.: 14/973,016

(22) Filed: Dec. 17, 2015

(65) Prior Publication Data

US 2016/0104945 A1    Apr. 14, 2016

Related U.S. Application Data

(63) Continuation of application No. PCT/CN2014/075941, filed on Apr. 22, 2014.

(51) Int. Cl.
*H01Q 21/00* (2006.01)
*H04B 1/18* (2006.01)
*H01Q 21/28* (2006.01)
*H01Q 21/30* (2006.01)
(Continued)

(52) U.S. Cl.
CPC ......... *H01Q 21/0006* (2013.01); *H01Q 5/321* (2015.01); *H01Q 21/28* (2013.01); *H01Q 21/30* (2013.01); *H04B 1/18* (2013.01); *H01Q 1/243* (2013.01)

(58) Field of Classification Search
USPC ................................................ 343/853, 860
See application file for complete search history.

(56) References Cited

U.S. PATENT DOCUMENTS 5,714,961 A * 2/1998 Kot .................. H01Q 13/18
                                                343/700 MS
6,337,670 B1 * 1/2002 Chen .................. H01Q 1/24
                                                343/700 MS
(Continued)

FOREIGN PATENT DOCUMENTS

CN    1320004 A    10/2001
CN    1922759 A    2/2007
(Continued)

OTHER PUBLICATIONS

Partial English Translation and Abstract of Chinese Patent Application No. CN102544761, dated Dec. 15, 2015, 10 pages.
(Continued)

*Primary Examiner* — Jessica Han
*Assistant Examiner* — Hai Tran
(74) *Attorney, Agent, or Firm* — Conley Rose, P.C.

(57) ABSTRACT

An antenna system includes a first antenna and a second antenna, where the first antenna and the second antenna are connected in parallel to an antenna feeding point, and a phase-shift apparatus is connected in series between the first antenna or the second antenna and the antenna feeding point, so that an imaginary part of impedance at the antenna feeding point is canceled out near a central frequency channel number. The antenna system provides an expansion in radio frequency bandwidth in free space and an increase in average efficiency.

20 Claims, 4 Drawing Sheets

(51) Int. Cl.
*H01Q 5/321* (2015.01)
*H01Q 1/24* (2006.01)

(56) References Cited

U.S. PATENT DOCUMENTS

| | | | |
|---|---|---|---|
| 7,184,727 B2* | 2/2007 | Poilasne | G01R 27/2694 343/860 |
| 2002/0000937 A1 | 1/2002 | Kozakzi | |
| 2002/0058483 A1 | 5/2002 | Shinichi et al. | |
| 2004/0204007 A1 | 10/2004 | Ho et al. | |
| 2007/0146210 A1 | 6/2007 | Hilgers | |
| 2008/0001828 A1 | 1/2008 | Black et al. | |
| 2008/0284655 A1* | 11/2008 | Alamouti | H01Q 1/38 343/700 MS |
| 2009/0318094 A1 | 12/2009 | Pros et al. | |
| 2010/0109967 A1 | 5/2010 | Ranta | |
| 2010/0295728 A1 | 11/2010 | Chen | |
| 2012/0218165 A1* | 8/2012 | Kato | H01P 1/213 343/852 |
| 2012/0280885 A1 | 11/2012 | Arai et al. | |
| 2013/0170530 A1 | 7/2013 | Yoshikawa et al. | |
| 2013/0342416 A1 | 12/2013 | Andujar Linares et al. | |

FOREIGN PATENT DOCUMENTS

| | | | |
|---|---|---|---|
| CN | 101728626 | A | 6/2010 |
| CN | 102299414 | A | 12/2011 |
| CN | 102341962 | A | 2/2012 |
| CN | 102544761 | A | 7/2012 |
| CN | 103155441 | A | 6/2013 |
| CN | 203456585 | U | 2/2014 |
| EP | 2178170 | A1 | 4/2010 |
| EP | 2472673 | A1 | 7/2012 |
| JP | 2002141732 | A | 5/2002 |
| WO | 2011083712 | A1 | 7/2011 |

OTHER PUBLICATIONS

Foreign Communication From a Counterpart Application, PCT Application No. PCT/CN2014/075941, English Translation of International Search Report dated Jan. 21, 2015, 2 pages.
Foreign Communication From a Counterpart Application, PCT Application No. PCT/CN2014/075941, Written Opinion dated Jan. 21, 2015, 4 pages.
Foreign Communication From a Counterpart Application, Chinese Application No. 201480001236.5, Chinese Office Action dated Nov. 11, 2015, 5 pages.
Foreign Communication From a Counterpart Application, Chinese Application No. 201480001236.5, Chinese Search Report dated Nov. 11, 2015, 2 pages.
Foreign Communication From a Counterpart Application, Chinese Application No. 2016-528307, Chinese Office Action dated Dec. 6, 2016, 3 pages.
Foreign Communication From a Counterpart Application, Chinese Application No. 2016-528307, English Translation of Chinese Office Action dated Dec. 6, 2016, 3 pages.
Foreign Communication From a Counterpart Application, European Application No. 14889900.8, Extended European Search Report dated Jun. 24, 2016, 10 pages.

* cited by examiner

ANTENNA SYSTEM AND TERMINAL

CROSS-REFERENCE TO RELATED APPLICATIONS

This application is a continuation of International Application No. PCT/CN2014/075941, filed on Apr. 22, 2014, which is hereby incorporated by reference in their entireties.

TECHNICAL FIELD

The present disclosure relates to the field of wireless communications technologies, and in particular, to an antenna system and a terminal.

BACKGROUND

Operators pay increasing attention to antenna performance of a handset of a user in an actual application scenario. Currently, as a higher requirement is imposed on free-space communication quality, requirements on communication quality of an antenna in a head phantom, a hand phantom, and a head and hand phantom are gradually increasing. A head and hand phantom communication state refers to a state in which a user is actually making a call. In the head and hand phantom communication state, when approaching an antenna, a human head and a human hand not only cause frequency deviation of the antenna, but also absorb energy, thereby causing a relatively great decrease in radiation and receiving performance of the antenna, where a case is even worse for an antenna with a metal frame structure. For example, when the human hand touches the antenna, a signal strength may dramatically decrease, the call of the user may get offline, and a network may not be found. It can be seen that how to increase efficiency of an antenna in a head and hand phantom scenario has currently become a hottest spot and a biggest difficulty in antenna design.

SUMMARY

In view of this, the present disclosure provides an antenna system in which radio frequency bandwidth of an antenna can be expanded in free space, and efficiency of the antenna can be increased in scenarios of a head phantom, a hand phantom, and a head and hand phantom.

A first aspect of the present disclosure provides an antenna system, where the antenna system may include a first antenna and a second antenna, where the first antenna and the second antenna are connected in parallel to an antenna feeding point, and a phase-shift apparatus is connected in series between the first antenna or the second antenna and the antenna feeding point, so that an imaginary part of impedance at the antenna feeding point is canceled out near a central frequency channel number.

With reference to the first aspect, in a first feasible implementation manner, the phase-shift apparatus is connected in series between the first antenna or the second antenna and the antenna feeding point, and input impedance Z1 of the first antenna and input impedance Z2 of the second antenna meet that: Z1=Z2; or Z1=A*Z2; or Z1=R1+JX1, Z2=R2+JX2, and R1*X2=R2*X1, where A is any real number.

With reference to the first feasible implementation manner of the first aspect, in a second feasible implementation manner, the phase-shift apparatus may include: a transmission line, an inductor-capacitor (LC) oscillation circuit, or an integrated phase shifter.

With reference to the second feasible implementation manner of the first aspect, in a third feasible implementation manner, the phase-shift apparatus includes a transmission line, where when the transmission line is a single transmission line and is connected in series between the first antenna or the second antenna and the antenna feeding point, a length L of the transmission line is $$n\frac{\lambda}{4},$$

where n is an odd number and λ represents a wavelength. When the transmission line includes a first transmission line and a second transmission line, the first transmission line is connected in series between the first antenna and the antenna feeding point, and the second transmission line is connected in series between the second antenna and the antenna feeding point, a length difference between the first transmission line and the second transmission line is $$n\frac{\lambda}{4},$$

where n is an odd number and λ represents a wavelength.

With reference to any one of the first aspect to the third feasible implementation manner of the first aspect, in a fourth feasible implementation manner, the first antenna and the second antenna are located at a same side or different sides of a mainboard of a terminal.

With reference to any one of the first aspect to the fourth feasible implementation manner of the first aspect, in a fifth feasible implementation manner, the first antenna or the second antenna includes any one of a monopole antenna and a loop antenna.

A second aspect of the present disclosure provides a terminal, where the terminal may include an antenna system, and the antenna system includes a first antenna and a second antenna, where the first antenna and the second antenna are connected in parallel to an antenna feeding point, the antenna feeding point is connected to a radio frequency transceiver circuit of the terminal, and a phase-shift apparatus is connected in series between the first antenna or the second antenna and the antenna feeding point, so that an imaginary part of impedance at the antenna feeding point is canceled out near a central frequency channel number.

With reference to the second aspect, in a first feasible implementation manner, the phase-shift apparatus is connected in series between the first antenna or the second antenna and the antenna feeding point, and input impedance Z1 of the first antenna and input impedance Z2 of the second antenna meet that: Z1=Z2; or Z1=A*Z2; or Z1=R1+JX1, Z2=R2+JX2, and R1*X2=R2*X1, where A is any real number.

With reference to the first feasible implementation manner of the second aspect, in a second feasible implementation manner, the phase-shift apparatus includes: a transmission line, an (LC) oscillation circuit, or an integrated phase shifter.

With reference to the second feasible implementation manner of the second aspect, in a third feasible implementation manner, when the phase-shift apparatus includes a transmission line, and when the transmission line is a single transmission line and is connected in series between the first antenna or the second antenna and the antenna feeding point, a length L of the transmission line is $$n\frac{\lambda}{4},$$

where n is an odd number and λ represents a wavelength. When the transmission line includes a first transmission line and a second transmission line, the first transmission line is connected in series between the first antenna and the antenna feeding point, and the second transmission line is connected in series between the second antenna and the antenna feeding point, a length difference between the first transmission line and the second transmission line is $$n\frac{\lambda}{4},$$

where n is an odd number.

With reference to any one of the second aspect to the third feasible implementation manner of the second aspect, in a fourth feasible implementation manner, the first antenna and the second antenna are located at a same side or different sides of a mainboard of the terminal.

With reference to any one of the second aspect to the fourth feasible implementation manner of the second aspect, in a fifth feasible implementation manner, the first antenna or the second antenna includes any one of a monopole antenna and a loop antenna.

It can be seen from the above that, in some feasible implementation manners of the present disclosure, an antenna system is provided, where the antenna system includes a first antenna and a second antenna, where the first antenna and the second antenna are connected in parallel to an antenna feeding point, and a phase-shift apparatus is connected in series between the first antenna or the second antenna and the antenna feeding point, so that an imaginary part of impedance at the antenna feeding point is canceled out near a central frequency channel number. In this way, in embodiments of the present disclosure, radio frequency bandwidth of the antenna system in free space can be expanded, and average efficiency can be increased; in addition, compared with efficiency when only the first antenna or the second antenna is used, efficiency of the antenna system in the embodiments of the present disclosure is increased in scenarios of a head phantom, a hand phantom, and a head and hand phantom.

DESCRIPTION OF EMBODIMENTS

The following uses specific embodiments to describe the present disclosure in detail.

Figure 1:
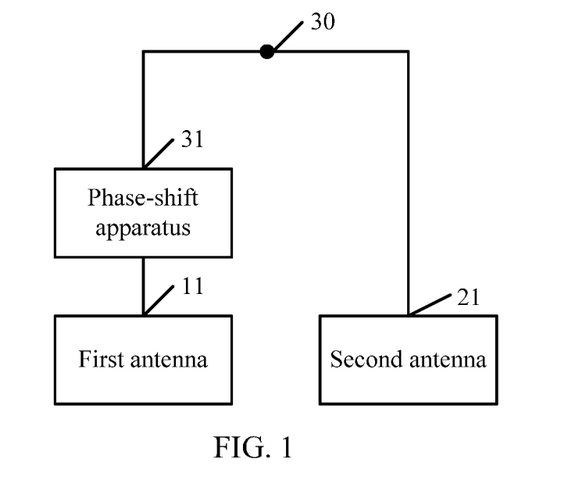
FIG. 1 is a schematic structural diagram of composition of an embodiment of an antenna system according to the present disclosure.

FIG. 1 is a schematic structural diagram of composition of an embodiment of an antenna system according to the present disclosure. As shown in FIG. 1, the antenna system may include: a first antenna 11 and a second antenna 21, where the first antenna 11 and the second antenna 21 are connected in parallel to an antenna feeding point 30, and a phase-shift apparatus 31 is connected in series between the first antenna 11 and the antenna feeding point 30, so that an imaginary part of impedance at the antenna feeding point 30 is canceled out near a central frequency channel number. It should be noted that, in FIG. 1, the phase-shift apparatus 31 is connected in series between the first antenna 11 and the antenna feeding point 30, but in specific implementation, a location of the phase-shift apparatus 31 may be connected in series between the second antenna 21 and the antenna feeding point 30 instead.

As a feasible implementation manner, in this embodiment of the present disclosure shown in FIG. 1, input impedance Z1 of the first antenna and input impedance Z2 of the second antenna meet that: Z1=Z2; or Z1=A×Z2; or Z1=R1+JX1, Z2=R2+JX2, and R1×X2=R2×X1, where A is any real number.

As a feasible implementation manner, the phase-shift apparatus 31 in this embodiment of the present disclosure may be a transmission line. As an implementation manner, a length L of the transmission line may be $$n\frac{\lambda}{4},$$

where n is an odd number, and λ is a wavelength.

Certainly, alternatively, in specific implementation, the phase-shift apparatus 31 in this embodiment of the present disclosure may be an inductor-capacitor LC circuit (which consists of an inductor and a capacitor), or a phase shifter formed by integrating the LC circuits. When the LC circuit or the phase shifter is used, in this embodiment of the present disclosure, an inductor and a capacitor that are of proper models may be selected to meet that an imaginary part of impedance at the antenna feeding point 30 is canceled out near a central frequency channel number. The central frequency channel number refers to a central frequency channel number of an operating frequency band of an antenna. The central frequency number may be also referred to as a resonance frequency channel number.

Generally, impedance of an antenna may be represented as Z=R+JX, where R is a real part of impedance Z, X is an imaginary part of Z, and in this embodiment of the present disclosure, that the imaginary part of the impedance of the antenna feeding point is canceled out means that at the central frequency channel number, impedance Z of the antenna feeding point includes only the real part R.

In specific implementation, the first antenna 11 and the second antenna 21 in this embodiment of the present disclosure may be located at a same side or different sides of a mainboard of a terminal, where a specific location is not limited. For example, both the first antenna 11 and the second antenna 21 may be located at bottom of the terminal, or located on top of the terminal; or the first antenna 11 is located on top of the terminal, and the second antenna 21 is located at bottom of the terminal.

In specific implementation, the first antenna 11 or the second antenna 21 in this embodiment of the present disclosure includes any one of a monopole antenna and a loop antenna. For example, both the first antenna 11 and the second antenna 21 are metal frame loop antennas, where an antenna size is 53 millimeter (mm)×10 mm×7.5 mm.

Figure 2:
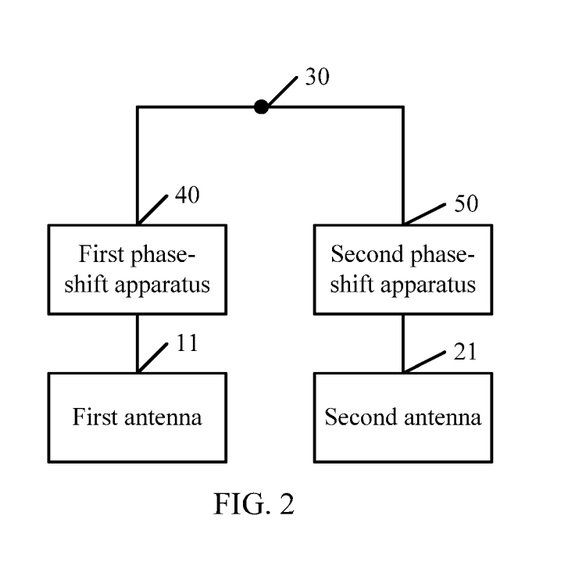
FIG. 2 is a schematic structural diagram of composition of another embodiment of an antenna system according to the present disclosure.

FIG. 2 is a schematic structural diagram of composition of another embodiment of an antenna system according to the present disclosure. As shown in FIG. 2, the antenna system may include: a first antenna 11 and a second antenna 21, where the first antenna 11 and the second antenna 21 are connected in parallel to an antenna feeding point 30, a first phase-shift apparatus 40 is connected in series between the first antenna 11 and the antenna feeding point 30, and a second phase-shift apparatus 50 is connected in series between the second antenna 21 and the antenna feeding point 30, so that an imaginary part of impedance at the antenna feeding point 30 is canceled out near a central frequency channel number.

As a feasible implementation manner, in this embodiment of the present disclosure shown in FIG. 2, input impedance Z1 of the first antenna and input impedance Z2 of the second antenna meet that: Z1=Z2; or Z1=A×Z2; or Z1=R1+JX1, Z2=R2+JX2, and R1×X2=R2×X1, where A is any real number.

As a feasible implementation manner, the phase-shift apparatus 40 and the phase-shift apparatus 50 may be transmission lines. Assuming that a first transmission line is connected between the first antenna and the antenna feeding point, and a second transmission line is connected between the second antenna and the antenna feeding point, in this case, as an implementation manner, a length L1 of the first transmission line and a length L2 of the second transmission line may meet that:

$$L1 - L2 = \pm n\frac{\lambda}{4},$$

where R1, R2, X1, and X2 are any real numbers, n is an odd number, and λ is a wavelength.

Certainly, alternatively, in specific implementation, in this embodiment of the present disclosure, the phase-shift apparatus 40 and the phase-shift apparatus 50 may be inductor-capacitor LC circuits (where an inductor-capacitor LC circuit consists of an inductor and a capacitor), or phase shifters formed by integrating the LC circuits. When the LC circuits or the phase shifters are used, in this embodiment of the present disclosure, an inductor and a capacitor that are of proper models may be selected to meet that an imaginary part of impedance at the antenna feeding point 30 is canceled out near a central frequency channel number (which refers to a central frequency channel number of an operating frequency band of an antenna, and may be also referred to as a resonance frequency channel number).

In specific implementation, the first antenna 11 and the second antenna 21 in this embodiment of the present disclosure may be located at a same side or different sides of a mainboard of a terminal, where a specific location is not limited. For example, both the first antenna 11 and the second antenna 21 may be located at bottom of the terminal, or located on top of the terminal; or the first antenna 11 is located on top of the terminal, and the second antenna 21 is located at bottom of the terminal.

In specific implementation, the first antenna 11 or the second antenna 21 in this embodiment of the present disclosure includes any one of a monopole antenna and a loop antenna. For example, both the first antenna 11 and the second antenna 21 are metal frame loop antennas, where an antenna size is 53 mm×10 mm×7.5 mm.

Figure 3:
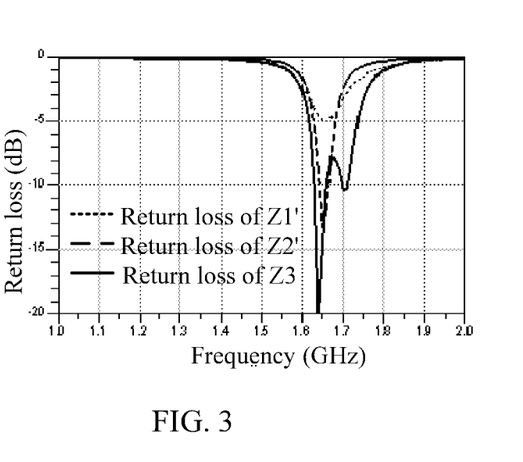
FIG. 3 is a schematic curve chart of a return loss according to the present disclosure.

Further, to present an effect of this embodiment of the present disclosure, it is assumed that impedance of the first antenna 11 becomes Z1' after a phase of the impedance is shifted by the transmission line with a length of L1, and impedance of the second antenna 21 becomes Z2' after a phase of the impedance is shifted by the transmission line with a length of L2, impedance of the antenna feeding point is Z3, Z3=Z2'//Z1' (that is, Z3 is parallel impedance of Z1' and Z2'). Referring to FIG. 3, a return loss curve of Z1' is a curve represented by a dotted line, a return loss curve of Z2' is a curve represented by a dashed line, and a return loss curve of Z3 is a curve represented by a solid line. It can be learned from FIG. 3 that, compared with those of Z1' and Z2', when a return loss of Z3 is −3 dB, bandwidth increases by more than one time and there is an obvious bandwidth expanding effect.

Figure 4:
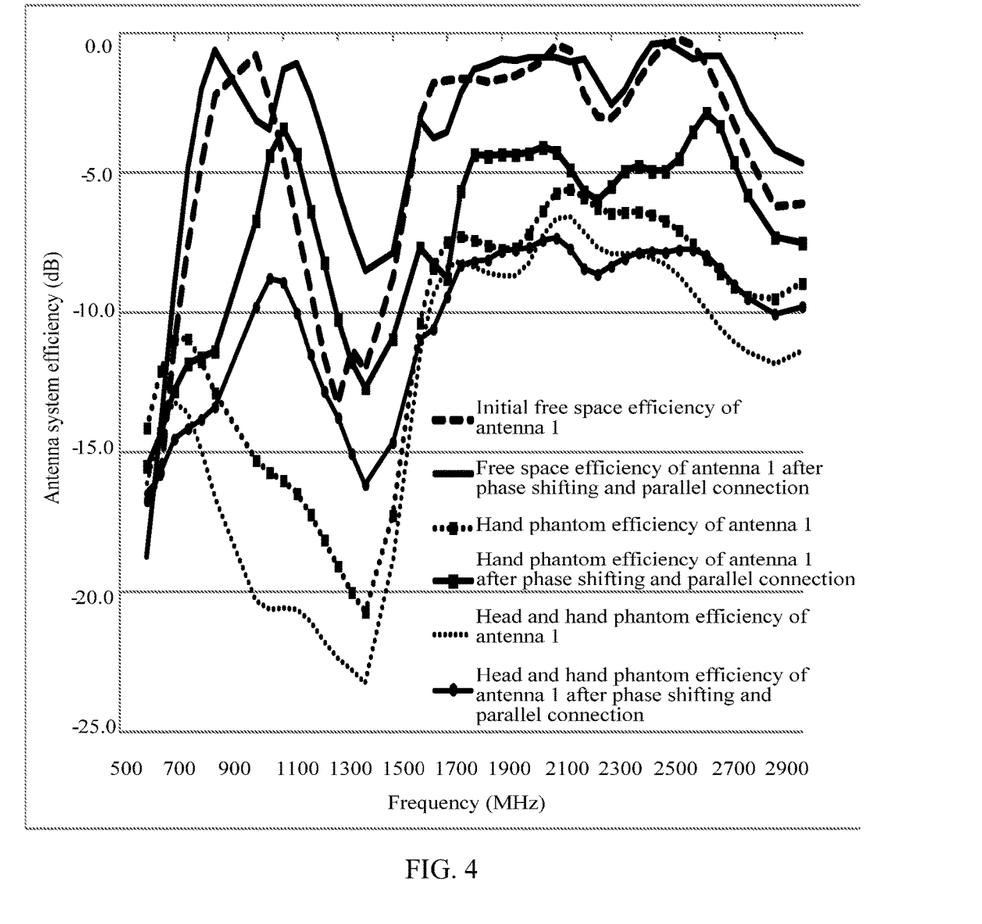
FIG. 4 is a schematic diagram of comparison, in scenarios of free space, a head phantom, a hand phantom, and a head and hand phantom, between efficiency of a first antenna before an antenna system of an embodiment of the present disclosure is used and efficiency of the first antenna after the antenna system of the embodiment of the present disclosure is used.

Further, FIG. 4 is a schematic diagram of comparison, in scenarios of free space, a head phantom, a hand phantom, and a head and hand phantom, between efficiency of the first antenna before the antenna system of this embodiment of the present disclosure is used and efficiency of the first antenna after the antenna system of this embodiment of the present disclosure is used. It can be learned from FIG. 4 that:

In the free space scenario, after the first antenna 11 is connected in parallel to the second antenna 21 by the using phase-shift apparatus, low frequency bandwidth of the entire antenna system is expanded by about 200 megahertz (MHz), where an efficiency limit is −4 decibel (dB), and high frequency bandwidth is expanded by about 100 MHz. After optimization, an entire LTE frequency band (704 MHz-960 MHz, 1710-2690 MHz) can be easily covered, and average efficiency of the entire antenna system in all bandwidths is increased to some extent.

In the hand phantom scenario, the first antenna 11 is increased by 7 dB in a low frequency hand phantom, and is increased by 3 dB in a high frequency hand phantom; and in the head and hand phantom scenario, a head and hand phantom low frequency of the first antenna 11 is increased by 5 dB, and a high frequency is increased by 1 dB.

In addition, when the antenna system in this embodiment of the present disclosure is not used, in the head and hand phantom scenario, low frequency of the first antenna 11 has a relatively large frequency deviation, and deviates toward low frequency for about 300 MHz, which is a great difficulty in actual design of how to balance free space performance, hand phantom performance, and head and hand phantom performance. However, after the antenna system of the present disclosure is used, there is no obvious frequency deviation in the hand phantom and the head and hand phantom of the entire antenna system, which can effectively solve this problem.

Figure 5:
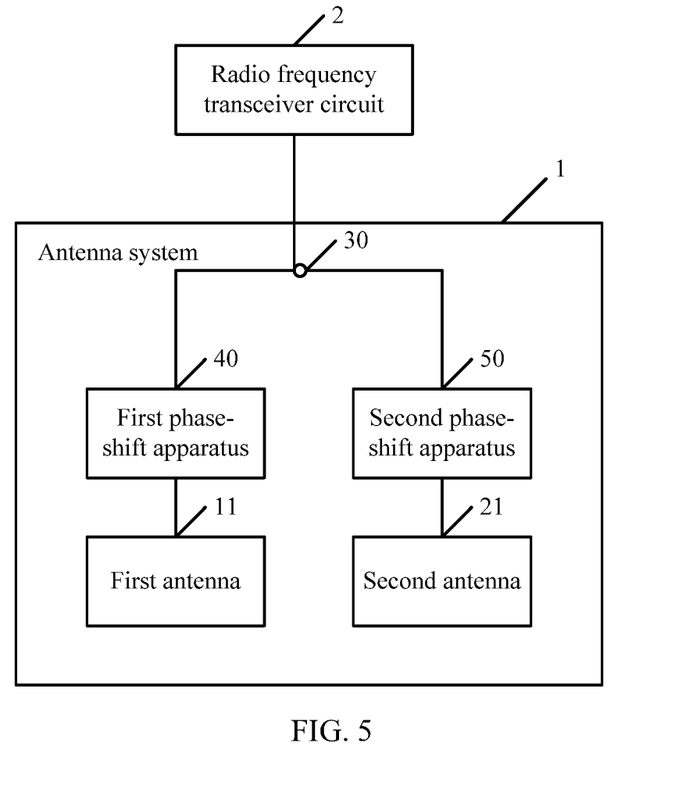
FIG. 5 is a schematic structural diagram of composition of an embodiment of a terminal according to the present disclosure.

Correspondingly, an embodiment of the present disclosure further provides a terminal. As shown in FIG. 5, the terminal may include an antenna system 1 and a radio frequency transceiver circuit 2 that are mentioned above in the present disclosure, where the radio frequency transceiver circuit 2 is connected to an antenna feeding point 30 of the antenna system 1. The antenna system 1 includes: a first antenna 11 and a second antenna 21, where the first antenna 11 and the second antenna 21 are connected in parallel to the antenna feeding point 30, and further, a first phase-shift apparatus 40 is connected in series between the first antenna 11 and the antenna feeding point 30, and a second phase-shift apparatus 50 is connected in series between the second antenna 21 and the antenna feeding point 30, so that an imaginary part of impedance at the antenna feeding point 30 is canceled out near a central frequency channel number.

In FIG. 5, only an instance of the antenna system 1 is illustrated. In specific implementation, the antenna system 1 in FIG. 5 of the present disclosure may include a first antenna and a second antenna, where the first antenna and the second antenna are connected in parallel to an antenna feeding point, and a phase-shift apparatus is connected in series between the first antenna or the second antenna and the antenna feeding point, so that an imaginary part of impedance at the antenna feeding point is canceled out near a central frequency channel number. Besides what is shown in FIG. 1 and FIG. 2, there may further be other specific embodiments of the antenna system that are not illustrated, and the instance shown in FIG. 5 cannot be used to limit the antenna system.

In summary, what is described above is merely exemplary embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. An antenna system, comprising:
   a first antenna, wherein the first antenna comprises a first input impedance Z1;
   a second antenna, wherein the second antenna comprises a second input impedance Z2;
   an antenna feeding point, wherein the first antenna and the second antenna are coupled in parallel to the antenna feeding point; and
   a phase-shift apparatus coupled in series between the first antenna or the second antenna and the antenna feeding point so that an imaginary part of an impedance at the antenna feeding point is canceled out near a central frequency channel number,
   wherein the first input impedance Z1 and the second impedance Z2 meet following conditions:

$Z1=R1+JX1,$ $Z2=R2+JX2,$ and $R1 \times X2 = R2 \times X1,$ and wherein A is any real number, R1 represents a first real portion of Z1, JX1 represents a first imaginary portion of Z1, R2 represents a second real portion of Z2, and JX2 represents a second imaginary portion of Z2.

2. The antenna system according to claim 1, wherein the first input impedance Z1 and the second input impedance Z2 are equal.

3. The antenna system according to claim 1, wherein the first input impedance Z1 and the second input impedance Z2 meet following condition: $Z1=A*Z2$.

4. The antenna system according to claim 1, wherein the phase-shift apparatus comprises a transmission line.

5. The antenna system according to claim 1, wherein the phase-shift apparatus comprises an inductor-capacitor (LC) oscillation circuit.

6. The antenna system according to claim 1, wherein the phase-shift apparatus comprises an integrated phase shifter.

7. The antenna system according to claim 1, wherein the phase-shift apparatus comprises a transmission line coupled in series between the first antenna and the antenna feeding point, wherein a length L of the transmission line is $$n\frac{\lambda}{4},$$

wherein n is an odd number, and wherein λ represents a wavelength.

8. The antenna system according to claim 1, wherein the phase-shift apparatus further comprises:
   a first transmission line; and
   a second transmission line,
   wherein the first transmission line is coupled in series between the first antenna and the antenna feeding point,
   wherein the second transmission line is coupled in series between the second antenna and the antenna feeding point,
   wherein a length difference between the first transmission line and the second transmission line is $$n\frac{\lambda}{4},$$

wherein n is an odd number, and
   wherein λ represents a wavelength.

9. The antenna system according to claim 1, wherein the first antenna comprises a monopole antenna.

10. The antenna system according to claim 1, wherein the first antenna comprises a loop antenna.

11. A terminal, comprising:
    a radio frequency transceiver circuit; and
    an antenna system coupled to the radio frequency transceiver circuit and comprising:
       a first antenna comprising a first input impedance Z1;
       a second antenna comprising a second input impedance Z2;
       an antenna feeding point, wherein the first antenna and the second antenna are coupled in parallel to the antenna feeding point, and wherein the antenna feeding point is coupled to the radio frequency transceiver circuit; and
       a phase-shift apparatus coupled in series between the first antenna and the antenna feeding point so that an imaginary part of an impedance at the antenna feeding point is canceled out near a central frequency channel number,
       wherein the first input impedance Z1 and the second input impedance Z2 meet following conditions:

$Z1=R1+JX1,$ $Z2=R2+JX2,$ and $R1 \times X2 = R2 \times X1,$ and wherein A is any real number, R1 represents a first real portion of Z1, JX1 represents a first imaginary portion of Z1, R2 represents a second real portion of Z2, and JX2 represents a second imaginary portion of Z2.

12. The terminal according to claim 11, wherein the first input impedance Z1 and the second input impedance Z2 are equal.

13. The terminal according to claim 11, wherein the first input impedance Z1 and the second input impedance Z2 meet following condition: Z1=A×Z2.

14. The terminal according to claim 11, wherein the phase-shift apparatus comprises a transmission line.

15. The terminal according to claim 11, wherein the phase-shift apparatus comprises an inductor-capacitor (LC) oscillation circuit.

16. The terminal according to claim 11, wherein the phase-shift apparatus comprises an integrated phase shifter.

17. The terminal according to claim 11, wherein the phase-shift apparatus comprises a transmission line coupled in series between the first antenna and the antenna feeding point, wherein a length L of the transmission line is $$n\frac{\lambda}{4},$$

wherein n is an odd number, and wherein λ represents a wavelength.

18. The terminal according to claim 11, wherein the phase-shift apparatus comprises:
   a first transmission line; and
   a second transmission line;
   wherein the first transmission line is coupled in series between the first antenna and the antenna feeding point,
   wherein the second transmission line is coupled in series between the second antenna and the antenna feeding point,
   wherein a length difference between the first transmission line and the second transmission line is $$n\frac{\lambda}{4},$$

wherein n is an odd number, and
wherein λ represents a wavelength.

19. The terminal according to claim 11, wherein the first antenna comprises a monopole antenna.

20. The terminal according to claim 11, wherein the first antenna comprises a loop antenna.

* * * * *

UNITED STATES PATENT AND TRADEMARK OFFICE
CERTIFICATE OF CORRECTION

PATENT NO. : 9,905,934 B2  
APPLICATION NO. : 14/973016  
DATED : February 27, 2018  
INVENTOR(S) : Hongyu Wang et al.

Page 1 of 1

It is certified that error appears in the above-identified patent and that said Letters Patent is hereby corrected as shown below:

Column 10; Line 2; Claim 18 should read:  
phase shift apparatus comprises:

Signed and Sealed this  
Tenth Day of April, 2018

Andrei Iancu  
*Director of the United States Patent and Trademark Office*